(12) United States Patent
Roger et al.

(10) Patent No.: US 11,789,114 B2
(45) Date of Patent: Oct. 17, 2023

(54) FMCW RADAR WITH FREQUENCY HOPPING

(71) Applicant: Infineon Technologies AG, Neubiberg (DE)

(72) Inventors: Andre Roger, Munich (DE); Markus Bichl, Feldkirchen-Westerham (DE); Maximilian Eschbaumer, Munich (DE); Farhan Bin Khalid, Munich (DE); Paul Meissner, Feldkirchen bei Graz (AT)

(73) Assignee: Infineon Technologies AG, Neubiberg (DE)

( * ) Notice: Subject to any disclaimer, the term of this patent is extended or adjusted under 35 U.S.C. 154(b) by 230 days.

(21) Appl. No.: 17/115,540

(22) Filed: Dec. 8, 2020

(65) Prior Publication Data

US 2021/0190905 A1 Jun. 24, 2021

(30) Foreign Application Priority Data

Dec. 20, 2019 (DE) .......................... 102019135473.0

(51) Int. Cl.
| | |
|---|---|
| *G01S 7/35* | (2006.01) |
| *G01S 13/56* | (2006.01) |
| *G01S 13/536* | (2006.01) |
| *G01S 7/02* | (2006.01) |
| *G01S 13/931* | (2020.01) |

(52) U.S. Cl.
CPC .............. *G01S 7/354* (2013.01); *G01S 7/023* (2013.01); *G01S 13/536* (2013.01); *G01S 13/56* (2013.01); *G01S 13/931* (2013.01)

(58) Field of Classification Search
CPC .... G01S 13/931; G01S 13/343; G01S 13/354; G01S 13/536; G01S 13/56; G01S 7/023
USPC ..................................................... 342/112, 70
See application file for complete search history.

(56) References Cited

U.S. PATENT DOCUMENTS

| | | | | |
|---|---|---|---|---|
| 6,453,168 | B1 * | 9/2002 | McCrady .............. | G01S 5/0218 455/456.6 |
| 6,665,333 | B2 * | 12/2003 | McCrady .................. | G01S 5/14 375/147 |
| 6,801,782 | B2 * | 10/2004 | McCrady .............. | G01S 5/0205 455/457 |
| 10,067,221 | B2 * | 9/2018 | Ginsburg .............. | G01S 13/931 |

(Continued)

FOREIGN PATENT DOCUMENTS

WO 2016/164472 A1 10/2016

*Primary Examiner* — Vladimir Magloire
*Assistant Examiner* — Michael W Justice
(74) *Attorney, Agent, or Firm* — Harrity & Harrity, LLP

(57) ABSTRACT

A method for the use in a radar system comprises: receiving an RF radar signal; down-converting the received RF radar signal into a base band using a frequency-modulated local oscillator signal including a scanning chirp having a higher bandwidth than a regular chirp bandwidth; generating a digital base band signal based on the down-converted RF radar signal, the digital base band signal including a sequence of samples associated with the scanning chirp; identifying, in the sequence of samples, impaired samples, which are affected by interference; and selecting—based on the position of the impaired samples within the sequence of samples—a sub-band, which has the regular chirp bandwidth, for transmitting chirps of chirp frame used for measurement data acquisition.

20 Claims, 8 Drawing Sheets

(56) References Cited

U.S. PATENT DOCUMENTS

| | | | | |
|---|---|---|---|---|
| 10,436,888 | B2* | 10/2019 | Li | G01S 13/886 |
| 10,502,824 | B2* | 12/2019 | Roger | G01S 7/023 |
| 10,775,489 | B2* | 9/2020 | Rao | G01S 13/931 |
| 10,823,819 | B2* | 11/2020 | Loesch | G01S 7/032 |
| 10,830,867 | B2* | 11/2020 | Lin | G01S 7/40 |
| 11,085,994 | B2* | 8/2021 | Roger | G01S 13/931 |
| 11,137,476 | B2* | 10/2021 | Ginsburg | G01S 13/931 |
| 11,175,376 | B2* | 11/2021 | Melzer | G01S 7/352 |
| 11,187,783 | B2* | 11/2021 | Doescher | G01S 7/0234 |
| 2001/0053699 | A1* | 12/2001 | McCrady | G01S 5/14 |
| | | | | 455/513 |
| 2002/0118723 | A1* | 8/2002 | McCrady | G01S 5/021 |
| | | | | 455/517 |
| 2004/0100626 | A1* | 5/2004 | Gulden | G01S 17/58 |
| | | | | 356/28.5 |
| 2014/0145872 | A1* | 5/2014 | Shirakawa | G01S 13/325 |
| | | | | 342/132 |
| 2016/0291130 | A1* | 10/2016 | Ginsburg | G01S 7/352 |
| 2017/0010344 | A1* | 1/2017 | Corbett | G01S 7/023 |
| 2017/0131394 | A1* | 5/2017 | Roger | G01S 13/343 |
| 2018/0172813 | A1* | 6/2018 | Rao | G01S 13/536 |
| 2018/0356495 | A1* | 12/2018 | Moss | G01S 7/021 |
| 2019/0011532 | A1* | 1/2019 | Loesch | G01S 7/032 |
| 2019/0011533 | A1* | 1/2019 | Ginsburg | G01S 7/352 |
| 2019/0056476 | A1* | 2/2019 | Lin | G01S 7/023 |
| 2019/0129002 | A1* | 5/2019 | Roger | G01S 13/931 |
| 2020/0057136 | A1* | 2/2020 | Doescher | G01S 13/343 |
| 2020/0088838 | A1* | 3/2020 | Melzer | G01S 7/023 |
| 2021/0156980 | A1* | 5/2021 | Stettiner | G01S 13/584 |
| 2021/0156981 | A1* | 5/2021 | Stettiner | G01S 7/0232 |
| 2021/0156982 | A1* | 5/2021 | Stettiner | G01S 13/931 |
| 2021/0389418 | A1* | 12/2021 | Ginsburg | G01S 13/32 |
| 2022/0026521 | A1* | 1/2022 | Melzer | G01S 7/023 |

* cited by examiner

— interferred signal
---- interferer signal 1
—·— Interferer signal 2
● interferred samples

FMCW RADAR WITH FREQUENCY HOPPING

CROSS REFERENCE TO RELATED APPLICATION

This application claims priority to German Patent Application No. 102019135473.0 filed on Dec. 20, 2019, the content of which is incorporated by reference herein in its entirety.

TECHNICAL FIELD

The present disclosure relates to the field of radar sensors, for example to radar sensing techniques that may allow improved target detection in the presence of interference.

BACKGROUND

Radar sensors can be found in numerous sensing applications in which distances and velocities of objects are to be measured. In the automotive sector, there is an increasing demand for radar sensors that may be used in so-called advanced driver-assistance systems (ADAS). Examples of an advanced driver assistive system are "adaptive cruise control" (ACC) and "radar cruise control" systems. Such systems may be used to automatically adjust the speed of an automobile so as to maintain a safe distance from other automobiles driving ahead. Other examples of advanced driver assistive system are blind-spot monitors, which may employ radar sensors to detect other vehicles in the blind spot of a vehicle. Particularly autonomous cars may use numerous sensors, such as radar sensors, to detect and locate various objects in their surroundings. Information about the position and velocity of objects in the area of an autonomous car is used to help navigate safely.

Modern radar systems make use of highly integrated RF circuits which may incorporate all core functions of an RF font-end of a radar transceiver in one single package (single chip transceiver). Such RF front-ends usually include, inter alia, a local RF oscillator (LO), power amplifiers (PA), low-noise amplifiers (LNA), and mixers. Frequency-modulated continuous-wave (FMCW) radar systems use radar signals whose frequency is modulated by ramping the signal frequency up and down. Such radar signals are often referred to as "chirp signals" or simply as "chirps". In the case of linear chirp signals the term "LFM signals" is sometimes used, wherein LFM stands for "linear frequency modulation". A radar sensor usually radiates sequences of chirps using one or more antennas, and the radiated signal is backscattered by one or more objects (referred to as radar targets) located in the field of view of a radar sensor. The backscattered signals (radar echoes) are received and processed by the radar sensor. The detection of the radar targets is usually accomplished using digital signal processing.

As more and more automobiles are being equipped with radar sensors, interference is becoming an issue. That is, the radar signal radiated by a first radar sensor (installed in one automobile) may intersperse to the reception antenna of a second radar sensor (installed in another automobile) and impair the operation of the second radar sensor.

SUMMARY

In accordance with one implementation, a method for the use in a radar system comprises: receiving an RF radar signal; down-converting the received RF radar signal into a base band using a frequency-modulated local oscillator signal including a scanning chirp having a higher bandwidth than a regular chirp bandwidth; generating a digital base band signal based on the down-converted RF radar signal, the digital base band signal including a sequence of samples associated with the scanning chirp; identifying, in the sequence of samples, impaired samples, which are affected by interference; and selecting—based on the position of the impaired samples within the sequence of samples—a sub-band, which has the regular chirp bandwidth, for transmitting chirps of chirp frame used for measurement data acquisition.

In accordance with another implementation, the method comprises generating a frequency-modulated local oscillator signal including a frame partitioned into N chirp positions (N being a predefined integer number), wherein the frame includes at least one scanning chirp at one or more chirp positions and regular chirps at the remaining chirp positions, the regular chirps having a chirp bandwidth and a start frequency and the at least one scanning chirp having a scanning bandwidth higher than the chirp bandwidth. The method further comprises transmitting an RF signal representing the frame, wherein the transmitter power is zero or reduced below a regular chirp power while transmitting the at least one scanning chirp; receiving an RF radar signal corresponding to the frame, down-converting the received RF radar signal into a base band using the local oscillator signal, and generating a digital signal based on the down-converted signal; detecting impaired samples, which are affected by interference, in a portion of the digital signal that corresponds to the scanning chirp, and updating the start frequency for the regular chirps following the scanning chirp based on the detected impaired samples; and detecting one or more radar targets based on the digital signal, wherein the portion of the digital signal not corresponding to the regular chirps is replaced by default samples.

In accordance with another implementation, the method comprises generating a frequency-modulated local oscillator signal including a plurality of frames of chirps and one or more scanning chirps between the frames; generating an RF signal, wherein a transmitter power of the RF signal is reduced or zero while generating the at least one scanning chirp; receiving an RF radar signal, down-converting the received RF radar signal into a base band using the local oscillator signal, and generating a digital signal based on the down-converted signal, the digital signal being composed of a plurality of sequences, wherein each sequence corresponds either to a chirp of a specific frame or to a scanning chirp; repeatedly generating, for each sequence, metadata indicating whether the respective sequence is impaired by interference; and repeatedly determining a starting frequency for the chirps of the frames based on the metadata.

Moreover, corresponding radar systems and devices are described herein.

BRIEF DESCRIPTION OF THE DRAWINGS

The implementation can be better understood with reference to the following drawings and descriptions. The components in the figures are not necessarily to scale; instead emphasis is placed upon illustrating the principles of the implementation. In the figures, like reference numerals designate corresponding parts. In the drawings.

DETAILED DESCRIPTION

Figure 1:
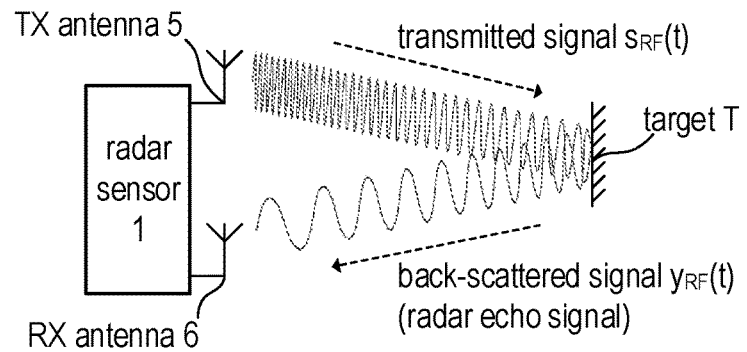
FIG. 1 is a sketch illustrating the operating principle of an FMCW radar system for distance and/or velocity measurement.

FIG. 1 illustrates one simplified example of a conventional frequency-modulated continuous-wave (FMCW) radar sensor 1. In the present example, separate transmission (TX) and reception (RX) antennas 5 and 6, respectively, are used (bistatic or pseudo-monostatic radar configuration). However, it is noted that a single antenna can be used, so that the reception antenna and the transmission antenna will be physically the same (monostatic radar configuration). The transmission antenna 5 (quasi-) continuously radiates an RF signal $s_{RF}(t)$, which is frequency-modulated, for example, by a saw-tooth-shaped signal. When the radiated signal $s_{RF}(t)$ is back-scattered from an object T, which may be located in the radar channel within the measurement range of the radar device, the back-scattered signal $y_{RF}(t)$ is received by the reception antenna 6. The object T is usually referred to as "radar target". In a more general example, more than one target may be in the field of view of a radar sensor, and an antenna array may be used instead of a single RX antenna. Similarly, an antenna array may be used instead of a single TX antenna. Using multiple RX and TX antennas in a multi-channel radar system allows for the measurement of the angle of incidence of a radar echo, usually referred to as direction of arrival (DoA). Measurement of the DoA is important for many applications, and thus most radar sensors will make use of antenna arrays. To keep the drawings simple, only one TX antenna and one RX antenna are shown in the figures. It is understood that the concepts described herein are readily applicable to radar sensors with antenna arrays.

Figure 2:
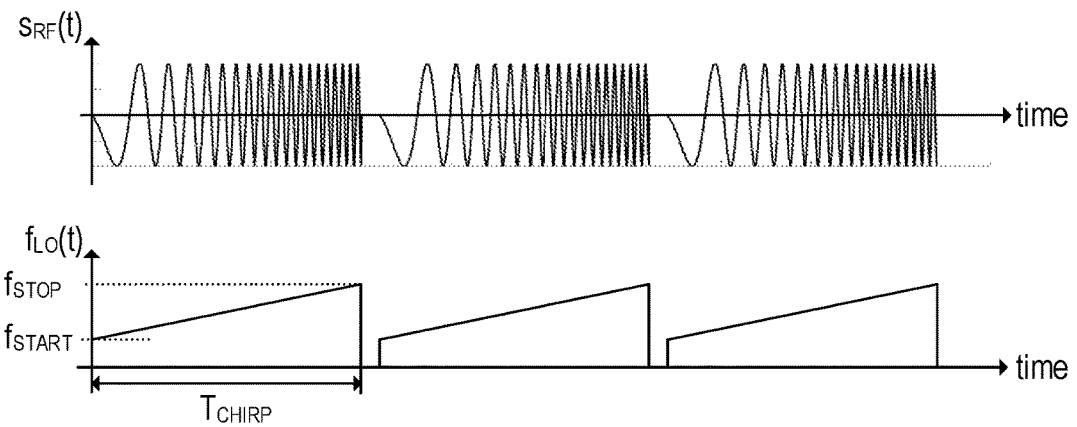
FIG. 2 includes two timing diagrams illustrating the frequency modulation of the RF signal used in FMCW radar systems.

FIG. 2 illustrates the mentioned frequency-modulation of the signal $s_{RF}(t)$. As shown in the top diagram of FIG. 2, the signal $s_{RF}(t)$ is composed of a series of "chirps", e.g. pulse-shaped sinusoidal waveforms with increasing (up-chirp) or decreasing (down-chirp) frequency. In the present example, the instantaneous frequency $f_{LO}(t)$ of a chirp increases linearly from a start frequency $f_{START}$ to a stop frequency $f_{STOP}$ within a defined time span $T_{CHIRP}$ (see bottom diagram of FIG. 2). Such a chirp is also referred to as a linear frequency ramp. A linear frequency-modulated (LFM) signal with three identical linear frequency ramps is illustrated in FIG. 2. It is noted, however, that the parameters $f_{START}$, $f_{STOP}$, $T_{CHIRP}$ as well as the pause between the individual frequency ramps may vary dependent on the actual implementation of the radar device and may also vary during operation of the radar device. In practice, the frequency variation may be, for example, linear (linear chirp, frequency ramp), exponential (exponential chirp) or hyperbolic (hyperbolic chirp), wherein linear chirps are mostly used.

Figure 3:
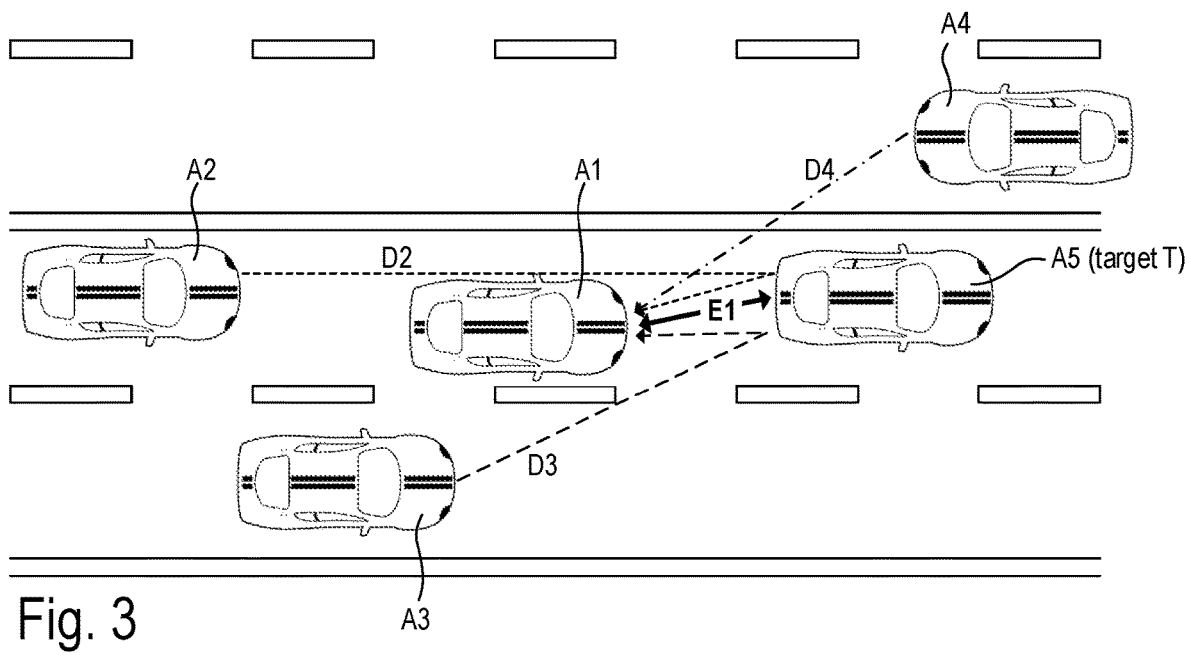
FIG. 3 illustrates one example of how interference is interspersed to the receiver of a radar sensor.

FIG. 3 illustrates one simple example showing how the operation of a radar sensor can be disturbed by other radar sensors, which are referred to as interferers. Accordingly, FIG. 3 illustrates a road with three lanes and five vehicles A1, A2, A3, A4, and A5. In the present example, vehicle A1 is considered as "own vehicle" and its radar sensor as "own radar sensor". The own radar sensor transmits a signal and senses an echo signal E1 back-scattered from vehicle A5, which is the radar target T to be detected by the own radar sensor. However, in addition to the desired echo signal E1, the own radar sensor receives disturbing signals D2, D3, D4 transmitted by the on-board radar sensors (interferers) of vehicles A2, A3 and A4. These disturbing signals interfere with the desired radar echo E1 and may negatively affect the detection of radar targets from the received radar signal (including echo E1 as well as disturbing signals D2, D3, and D4).

Figure 4:
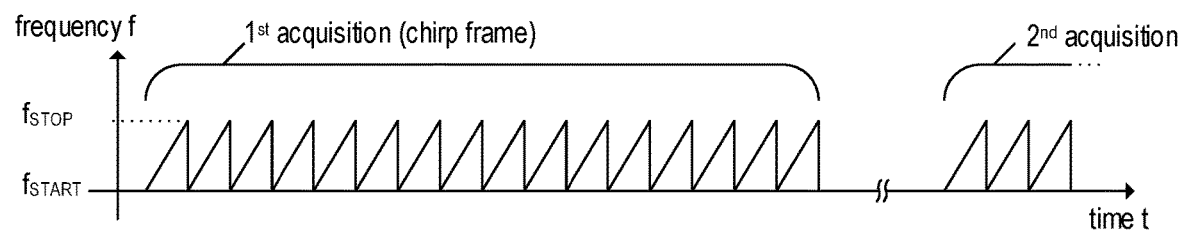
FIG. 4 is a timing diagram illustrating a frame of chirps used for data acquisition in a radar sensor.

FIG. 4 schematically illustrates an example of a frequency modulation scheme as is commonly implemented in FMCW radar sensors. In the depicted example, a sequence of sixteen up-chirps is transmitted for one data acquisition. Such a sequence of a defined number of chirps is referred to as "chirp frame". It is noted that, in practice, a chirp frame usually includes many more chirps (e.g. 256 chirps) and the present example has been simplified for illustration purposes only. A radar sensor transmits a frequency modulated RF radar signal such as depicted in FIG. 4 and receives a respective RF radar echo signal. One example signal processing method for evaluating the radar echoes will be discussed later with reference to FIG. 12. At this point it should be noted that one frame is used for one acquisition of radar data (digitized base band radar signal) based on which a target detection can be performed. In particular, the data corresponding to one chirp frame may constitute the complete input data for a Range-Doppler-FFT allowing determining range and velocity information from the data corresponding to a single chirp frame.

Figure 5:
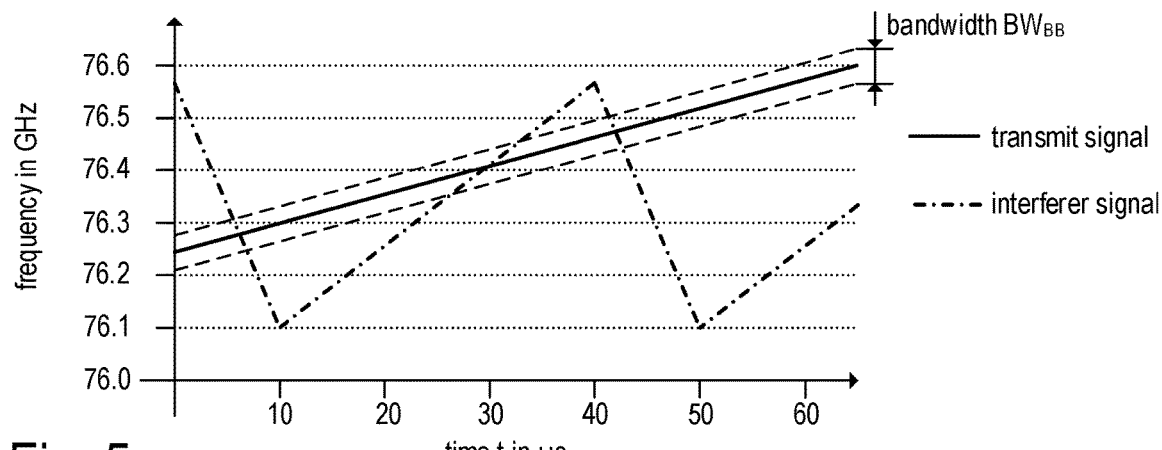
FIG. 5 illustrates in a timing diagram a transmit signal of a radar sensor and an interference signal from an interferer, wherein the frequency-over-time waveforms of these signals at least partially overlap.
Figure 6:
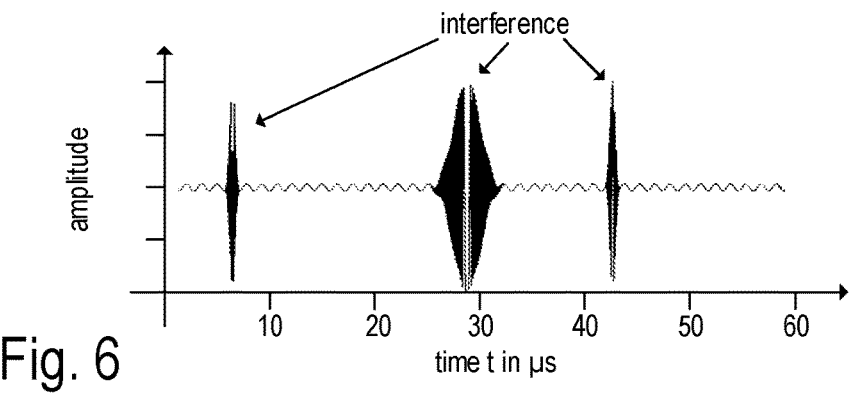
FIG. 6 illustrates one example waveform including a radar signal (after down-conversion to the base band) which includes a radar echo from a target and interference shown in FIG. 5.

Dependent on the characteristics of the interfering signals (cf. FIG. 3, signals D2, D3, and D4) the desired radar echoes may be affected in different ways. FIGS. 5 and 6 illustrate, by way of example, how an interferer may disturb the received radar echoes, when the interfering signals include chirps that have different parameters, particularly a different frequency slope than the radar echoes. FIG. 6 illustrates frequency over time of one chirp (chirp duration 60 µs) radiated by the own radar sensor in the example of FIG. 3. The start frequency of the radiated signal $s_{RF}(t)$ is approximately 76250 MHz and the stop frequency is approximately 76600 MHz. An interference signal (e.g. disturbing signal D3 in the example of FIG. 3) generated from another radar sensor includes an up-chirp starting at approximately 76100 MHz and stopping at 76580 MHz (chirp duration 30 µs) and a subsequent down-chirp starting at the stop frequency of the preceding up-chirp (76580 MHz) and stopping at the start frequency of the next up-chirp (76100 MHz) with a chirp duration of 10 µs. The bandwidth $BW_{BB}$ of the base band signal of the own radar sensor is indicated in FIG. 5 by the dashed lines. It is noted that, when an IQ-mixer (in-phase/quadrature-mixer) is used to convert the received RF signal into the base-band, the resulting digital base band signal can be considered as a complex-valued (analytical) signal which includes either only positive or only negative frequency components (spectral lines) dependent on how the IQ-mixer is implemented FIG. 6 illustrates an example waveform of the (pre-processed) base band signal resulting from the received radar signal including a desired radar echo and interference. One can see that the signal components due to the interference have a significant magnitude in those time intervals in which the frequency of the interference signal is within the bandwidth $BW_{BB}$ of the radar sensor (see FIG. 5). In the present example, the interference occurs three times during the 60 µs chirp duration, namely at approximately 7 µs, 28 µs and 42 µs. As mentioned, the power of interference signals is usually higher than the power of radar echoes from real targets. Accordingly, the power of the received RF signal will increase when it is interfered. Nevertheless, interferences appear as comparably short bursts, whose duration depends on for how long the bandwidths of the signals overlap. Therefore, usually not all chirps of one frame (see FIG. 4) are affected by interference. Further, interference signals and the transmit signal of a specific radar sensor are, in the present example, uncorrelated and thus the interference can be regarded as noise and increases the overall noise floor. The base band signal shown in FIG. 6 is processed as a digital signal, which can be partitioned into frames corresponding to the chirp frames in the emitted RF radar signal. Each frame of the digital signal includes a plurality of digital samples, and a frame can again be partitioned into segments corresponding to the individual chirps of a frame in the emitted RF radar signal. As mentioned above, the power of the received RF signal (and thus also the power of the resulting base-band signal) is higher when it includes interference as compared to a situation in which it includes only echo signals from real radar targets. Therefore, samples which are impaired by interference may be easily detected using a digital threshold detector. Before discussing some new concepts of how to mitigate/avoid interference, an example of a radar sensor and particularly an RF front-end of a radar sensor is explained in greater detail, which should help to better understand the discussion further below. The examples discussed herein relate to a radar system with an RF frontend that uses a mixer which produces a real-valued base-band signal. It is understood that the concepts described herein can be readily applied to radar systems with RF frontends that use an IQ mixer which produces a complex-valued (e.g. analytical) signal. Down-conversion/Demodulation using IQ-mixers is a technique that is as such known in the field of radar sensors and is thus not separately explained herein.

Figure 7:
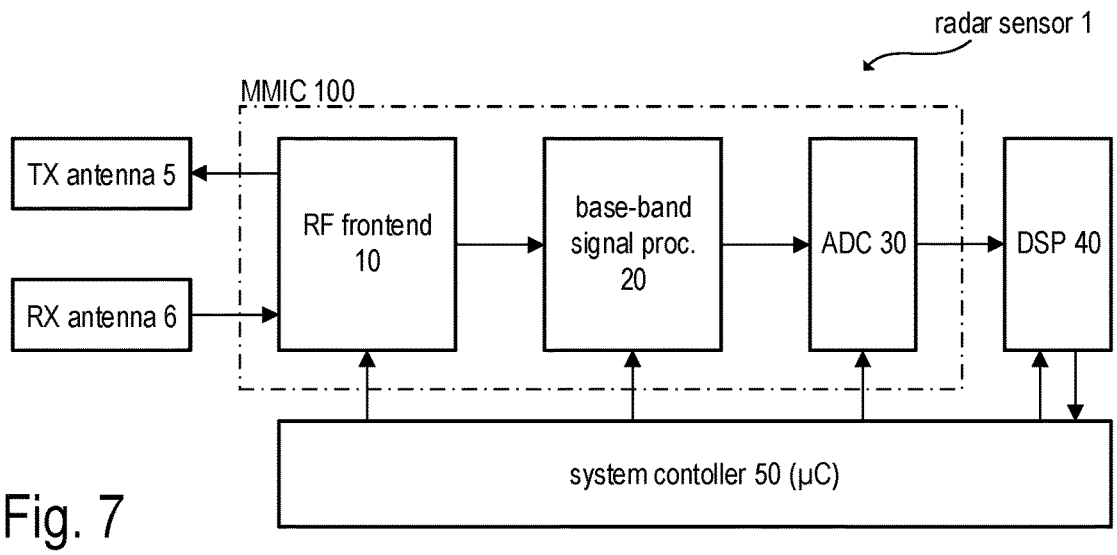
FIG. 7 is a block diagram illustrating the basic structure of an FMCW radar device.

FIG. 7 is a block diagram that illustrates an example structure of radar sensor 1. Accordingly, at least one transmission antenna 5 (TX antenna(s)) and at least one reception antenna 6 (RX antenna(s)) are connected to an RF frontend 10, which may be integrated in a semiconductor chip, usually referred to as monolithic microwave integrated circuit (MMIC). The RF frontend 10 may include all the circuit components used for RF signal processing. Such circuit components may include, for example, a local oscillator (LO), RF power amplifiers, low noise amplifiers (LNAs), directional couplers such as rat-race-couplers and circulators, and mixers for the down-conversion (demodulation) of RF signals (e.g. the received signal $y_{RF}(t)$, see FIG. 1) into the base-band (also referred to IF-band). As mentioned, antenna-arrays may be used instead of single antennas. The depicted example shows a bistatic (or pseudo-monostatic) radar system, which has separate RX and TX antennas. In case of a monostatic radar system, a single antenna or a single antenna array may be used for both, receiving and transmitting electromagnetic (radar) signals. In this case a directional coupler (e.g. a circulator) may be used to separate RF signals to be transmitted to the radar channel from RF signals received from the radar channel.

In the case of an FMCW radar sensor, the RF signals radiated by the TX antenna 5 may be in the range between approximately 20 GHz (e.g. 24 GHz) and 81 GHz (e.g. about 77 GHz in automotive applications). As mentioned, the RF signal received by the RX antenna 6 includes the radar echoes, e.g. the signals that have been back-scattered from the radar target(s) and, as the case may be, disturbing signals emitted by other radar sensors (interferers). The received RF signal $y_{RF}(t)$ is down-converted into the base band and further processed in the base-band using analog signal processing (see FIG. 8, base-band signal processing chain 20), which basically includes filtering and amplification of the base-band signal and thus determines the bandwidth of the received signal (cf. FIG. 5, bandwidth B). The base-band signal is finally digitized using one or more analog-to-digital converters 30 and further processed in the digital domain (see FIG. 3, digital signal processing chain implemented, e.g., in digital signal processor 40). The overall system is controlled by a system controller 50, which may be at least partly implemented using a processor executing appropriate firmware. The processor may be included, e.g. in a microcontroller, a digital signal processor, or the like. The digital signal processor 40 (DSP) may be part of the system controller 50 or separate therefrom. Signal processor and system controller may be integrated in an application specific integrated circuit (ASIC). The RF frontend 10 and the analog base-band signal processing chain 20 (and optionally the ADC 30) may be integrated in a single MMIC. However, the components shown in FIG. 7 may be distributed among two or more integrated circuits. Particularly, some parts of the digital signal processing may be done in the MIMIC.

Figure 8:
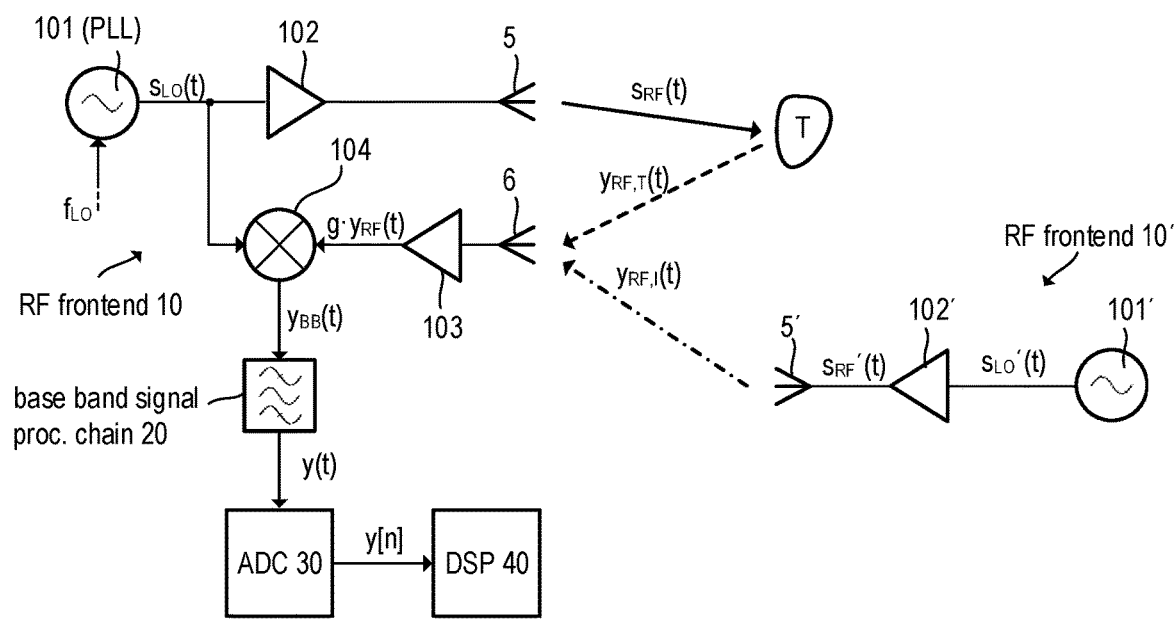
FIG. 8 is a circuit diagram illustrating one example of an analog RF frontend of a radar sensor and an analog RF frontend of an interferer.

FIG. 8 illustrates one example implementation of the RF frontend 10, which may be included in the radar sensor shown in FIG. 7. It is noted that FIG. 8 is a simplified circuit diagram illustrating the basic structure of an RF frontend. Actual implementations, which may heavily depend on the application, may of course be more complex. In particular, many practical implementations include multiple reception and transmission channels, wherein only one reception channel (composed of, inter alia, LNA 103, mixer 104, and base band processing chain 20) and one transmission channel (composed of, inter alia, power amplifier 102) are shown in the depicted example to keep the illustration simple. The RF frontend 10 includes a local oscillator (LO) 101 that generates a RF signal $s_{LO}(t)$, which may be frequency-modulated as explained above with reference to FIGS. 2 and 4. The signal $s_{LO}(t)$ is also referred to as LO signal. In radar applications, the LO signal is usually in the SHF (Super High Frequency) or the EHF (Extremely High Frequency) band, e.g. between 76 GHz and 81 GHz in automotive applications.

The LO signal $s_{LO}(t)$ is processed in the transmit signal path (transmission channel) as well as in the receive signal path (reception channel). The transmit signal $s_{RF}(t)$, which is radiated by the TX antenna 5, is generated by amplifying the (frequency-modulated) LO signal $s_{LO}(t)$, e.g., using an RF power amplifier 102. The output of the amplifier 102 is coupled to the TX antenna 5 e.g. via strip lines, a coupler, matching network, etc. (not shown in FIG. 9). The transmit signal $s_{RF}(t)$ is also referred to as outgoing RF radar signal. The received RF signal $y_{RF,T}(t)$, which is provided by the RX antenna 6, is provided to a mixer 104. In the present example, the received RF signal $y_{RF}(t)$ (e.g. the antenna signal) is pre-amplified by RF amplifier 103 (e.g. by a low-noise amplifier, LNA, with gain g), so that the mixer receives the amplified RF signal $g \cdot y_{RF}(t)$ at its RF input. The mixer 104 further receives the frequency-modulated LO signal $s_{LO}(t)$ at its reference input and is configured to down-convert (e.g. demodulate) the amplified RF signal $g \cdot y_{RF}(t)$ into the base band. The resulting base-band signal at the mixer output is denoted as $y_{BB}(t)$. The base-band signal $y_{BB}(t)$ is further processed by the analog base band signal processing chain 20 (see also FIG. 8), which basically includes one or more filters (e.g. a band-pass filter or high-pass and low-pass filters) to remove undesired side bands and image frequencies as well as one or more amplifiers. The analog output signal of the base-band signal processing chain 20 is denoted as y(t) and is may be supplied to an analog-to-digital converter (ADC) 30 (see also FIG. 8). The digital signal y[n] output by the ADC 30 is referred to as digital radar signal that includes the digital radar data.

It is understood that the digital radar signal is partitioned into frames that correspond to the chirp frames of the LO signal $s_{LO}(t)$, and each frame of the digital radar signal can be subdivided into a plurality of segments corresponding to the plurality of chirps in the corresponding chirp frame. One data acquisition (e.g. one measurement process) uses the acquisition of one frame of digital radar data, wherein the data acquisition is repeated at a defined (frame) repetition rate. The digital radar signal (e.g. frame by frame) may be supplied to a processor such as digital signal processor 40, which is programmed to further process the digital radar signal, e.g. by applying algorithms summarized as Range/Doppler processing. The implementation of the circuit components shown in FIG. 8 are as such known in the context of a radar sensor and thus not further explained in more detail.

FIG. 8 also illustrates how a desired radar echo and a radar signal transmitted by another radar sensor interfere. FIG. 8 further shows the radar frontend 10' of a further radar sensor, wherein only the local oscillator 101' and the transmission channel (including amplifier 102') and the transmission antenna 5' are shown to keep the illustration simple. The further radar sensor radiates a signal $s_{RF}'(t)$. The resulting RF signal arriving at the reception antenna 6 of the first radar sensor is denoted as RF interference signal $y_{RF,I}(t)$. The reception antenna 6 of the first radar sensor receives the RF interference signal $y_{RF,I}(t)$ together with the desired RF echo signal $y_{RF,T}(t)$ caused by the radar target T, from which the signal $s_{RF}(t)$ of the first radar sensor is back-scattered.

Both the radar echo $y_{RF,T}(t)$ and the interference signal $y_{RF,I}(t)$ are received by the antenna 6 and superpose at the RF input of mixer 104 ($y_{RF}(t)=y_{RF,T}(t)+y_{RF,I}(t)$). It can be seen from FIG. 8 that the interference signal component $y_{RF,I}(t)$ of the received signal $y_{RF}(t)$ is down-converted into the base band in the same way as radar echoes $y_{RF,T}(t)$ included in the received signal $y_{RF}(t)$. Accordingly, when the frequency difference between the instantaneous frequency $f_{LO}$ of the transmit signal $s_{RF}(t)$ and the instantaneous frequency of the received interference signal $y_{RF,I}(t)$ lies within the bandwidth $BW_{BB}$ of the base-band signal processing chain 20, interference will also be present in the digital radar signal y[n].

Several concepts for mitigating interference in radar sensors exist. Some of these concepts can be combined. According to some approaches, frames or individual segments (corresponding to specific chirps) which are impaired by interference are simply detected and discarded. Other approaches aim at cancelling the signal components due to interference and restoring the original non-interfered signal in the digital domain. The concept described below aims at avoiding interference by modifying chirp parameters (particularly the start frequency of a chirp parameter) before, at the beginning of or within a chirp frame.

For the following discussion it is assumed that the local oscillator of a radar sensor can be tuned throughout a relatively large frequency band. For example, the local oscillator allows to tune the LO frequency $f_{LO}$ of the LO signal $s_{LO}(t)$ from 76 GHz to 81 GHz. That is, in the present example, the maximum bandwidth $BW_{MAX}$ of the radar sensor is 5 GHz. However, during normal operation, the bandwidth BW of the chirps used for a radar data acquisition may be significantly lower, for example, 1-3 GHz. This means that the "position" of the chirp bandwidth BW may be shifted within the maximum bandwidth $BW_{MAX}$ without changing anything in the subsequent signal processing used for target detection.

It is noted that linearity of the frequency modulation is important for the quality of the radar measurement. Although common implementations of local oscillators (usually a voltage-controlled oscillator coupled in a phase-locked loop) can be tuned throughout a relatively large bandwidth of 5 GHz, the achievable linearity of a 5 GHz frequency ramp (referred to as broadband chirp) would be insufficient for normal radar measurements. By tuning the local oscillator only through the relatively small chirp bandwidth of, e.g., 1 GHz, a significantly better linearity can be achieved.

Figure 9:
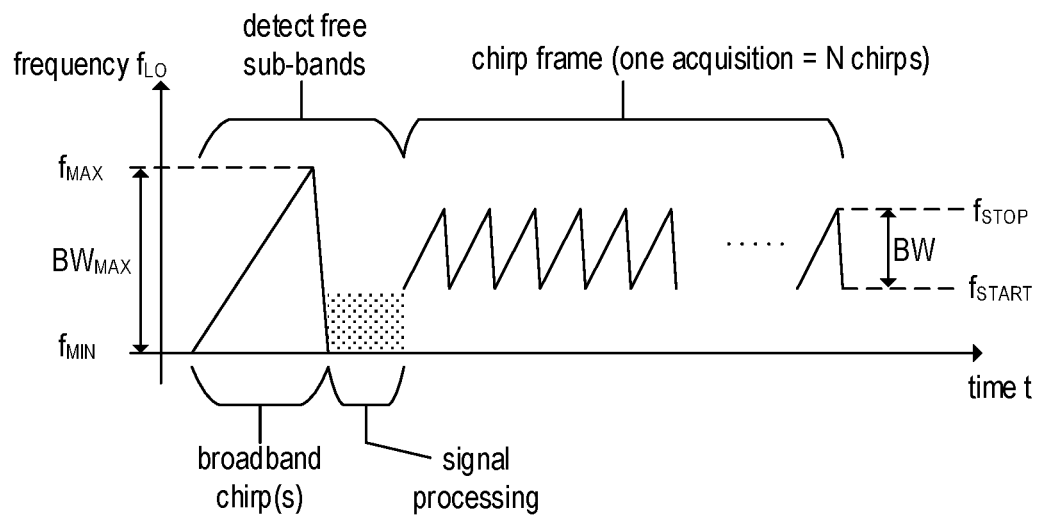
FIG. 9 illustrates an example of a chirp frame with a preceding scanning chirp.

FIG. 9 illustrates one example implementation of a concept that may be described as frequency hopping (although this term has a somewhat different meaning in the field of wireless communications). FIG. 9 includes a frequency vs. time diagram illustrating the instantaneous frequency $f_{LO}(t)$ of the LO signal $s_{LO}(t)$, which can be generated, for example, by the local oscillator 101 in the example of FIG. 8. Accordingly, the LO signal $s_{LO}(t)$ includes a plurality of chirp frames, each, composed of N chirps (N being a positive integer number greater than one, e.g. N=256), wherein the bandwidth BW of the N chirps of a chirp frame is smaller than the maximum bandwidth $BW_{MAX}$. The start frequency of each chirp is denoted as $f_{START}$, and the stop frequency $f_{STOP}$ is thus $f_{START}+BW$ for an up-chirp. During operation an amplified version of the chirp frame is radiated as RF radar signal $s_{RF}(t)$. Before generating the first chirp of a chirp frame, a broadband chirp is generated, which has a higher bandwidth than the regular chirps of a chirp frame. In the depicted example, the broadband chirp has a bandwidth equal to the maximum bandwidth $BW_{MAX}$. The broadband chirp is a "passive" chirp which means that the transmitter power is significantly reduced or even zero while the local oscillator generates the broadband chirp. For example, the power amplifier 102 (see FIG. 8) may be disabled during a broadband chirp.

A passive broadband chirp allows to scan the full bandwidth $f_{MAX}-f_{MIN}=BW_{MAX}$ for potential interferers. Therefore, a passive, broadband chirp is also referred to as "scanning chirp". As a scanning chirp is passive, no radar echoes will be included in the received RF signal $y_{RF}(t)$; if an interferer is present in the vicinity of the radar sensor, the received RF signal will, nevertheless, include the interference signal $y_{RF,I}(t)$ caused by the interferer (see also FIG. 8). In the receive channel of the radar sensor, the interference signal $y_{RF,I}(t)$ is demodulated using the broadband chirp, and—if an interferer is present—the interferences caused by one or more interferers become manifest in the resulting (digital) base band signal y[n] as shown, for example, in FIG. 6. As the scanning chirp is a broadband chirp, a relatively large bandwidth (or the full bandwidth $BW_{MAX}$ of the radar sensor) is "scanned" for potential interferers. The signal segment of the digital radar signal y[n] that corresponds to the scanning chirp may be analyzed in order to detect a suitable frequency band with the chirp bandwidth BW within the full frequency range from $f_{MIN}$ to $f_{MAX}$. In this context suitable frequency band means a frequency band with bandwidth BW that includes no or only few interferences. The start frequency $f_{START}$ of the (active) chirps of a chirp frame used for one radar data acquisition may then be varied such that the frequency range from $f_{START}$ to $f_{STOP}=f_{START}+BW$ includes no interferences or as few interferences as possible. One efficient approach for detecting suitable sub-bands for transmitting a chirp frame is described below. In radar systems with multiple input (reception) channels and multiple output (transmission) channels—so-called MIMO systems—only a single input/reception channel may be active while generating a scanning chirp to reduce the power consumption of the radar system. As scanning chirps are only used to detect interferers (and not real radar targets) a single active input channel is sufficient. The other input/reception channels are only used in time intervals, in which the regular chirps of a chirp frame are radiated.

Figure 10:
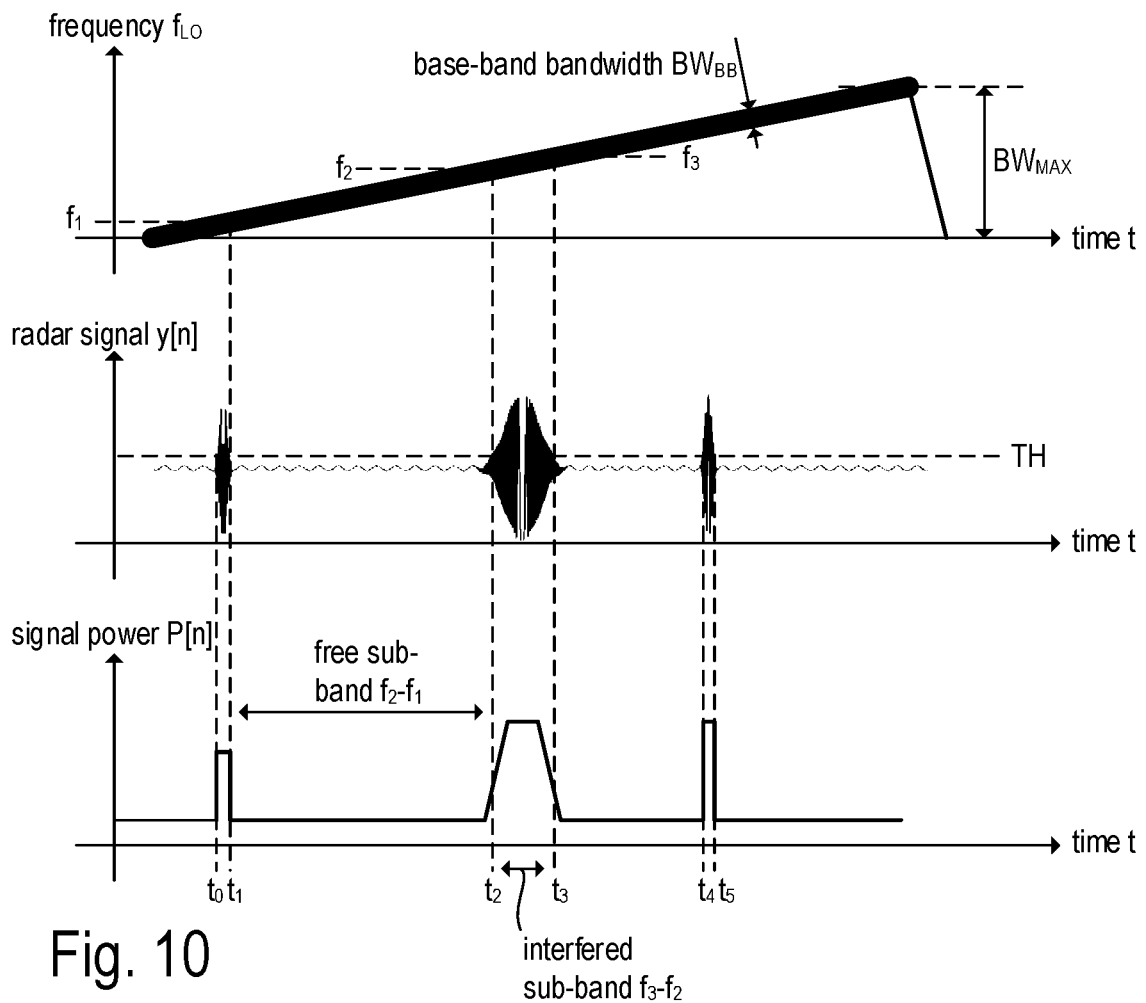
FIG. 10 illustrates a concept for determining suitable sub-bands for radiating the chirps of a chirp frame.

FIG. 10 illustrates, in the top diagram, one scanning chirp, which covers the full bandwidth $BW_{MAX}$, as well as the corresponding signal segment of the digital radar signal y[n]. As can be seen in the middle diagram of FIG. 10, the digital radar signal y[n] includes interferences caused by one or more interferers. It is understood that the digital radar signal y[n] is a time discrete signal composed of a plurality of digital samples associated with discrete time instants. The bottom diagram of FIG. 10 illustrates a signal P[n] that represents the instantaneous power of the digital radar signal. In one example the signal P[n] may simply represent the envelope of the digital radar signal P[n]. For the concept described herein, it is not important how the signal P[n] is actually defined and calculated. The purpose of FIG. 10 is to show that the samples of the digital radar signal y[n] which are impaired by interference can be easily detected using a threshold detection technique. That is, each sample whose power exceeds a defined threshold is detected as impaired by interference. It is understood that this is equivalent to detecting samples whose magnitude exceeds a corresponding threshold TH. As indicated above, the concepts described herein can be readily applied in radar systems which use IQ-mixers for the down-conversion of the received RF radar signals into the base-band. In this case the digital radar signal can be regarded as a complex-valued signal, for which the magnitude can be calculated as the square root of the sum of the squares of real and imaginary part. To avoid calculating the square root, the squared magnitude (representing a signal power) may be compared with a corresponding threshold.

In the example of FIG. 10, top diagram, it can be seen that each time instant $t_1$, $t_2$, $t_3$, etc. is associated with a respective frequency $f_1$, $f_2$, $f_3$, etc. As the scanning chirp is a linear frequency ramp, each sample of the digital radar signal is associated with a respective (discrete) frequency; and in the event that a specific sample is detected as being impaired by interference, the respective discrete frequency can be regarded as "blocked by interference". Conversely, all other samples which are not detected as being impaired by interference correspond to respective discrete frequencies which are "free", e.g. not blocked by interference.

As can be seen from FIG. 10, although the impaired samples are detected in the time domain (e.g. by comparing, sample-by-sample, the magnitude of each sample with a threshold TH), the result of this detection can be directly mapped to free and blocked frequencies. In the example of FIG. 10, the time interval from $t_1$ to $t_2$, which does not include samples detected as impaired, can directly be mapped to the frequency interval from $f_1$ to $f_2$. The sample-wise detection of impaired samples in the time domain directly yields free frequency intervals. In the present example, the start frequency $f_{START}$ can be set to a frequency equal to $f_1$ or slightly above to shift the chirps of the subsequently transmitted chirp frame into a free sub-band. At this point it is noted that no calculations are required to determine the free sub-bands. The sample rate and thus the sampling interval Δt of the ADC 30 (See FIG. 8) is a known system parameter, and due to the use of linear frequency ramps the time interval Δt is proportional to a frequency increment Δf, which is thus also a known system parameter and depends on the steepness of the frequency ramp. In a segment of a the digital radar signal that corresponds to a scanning chirp, the first sample can be mapped to the starting frequency, the second sample to the frequency $f_{START}+Δf$, the third sample to the frequency $f_{START}+2Δf$, and so on.

Figure 11:
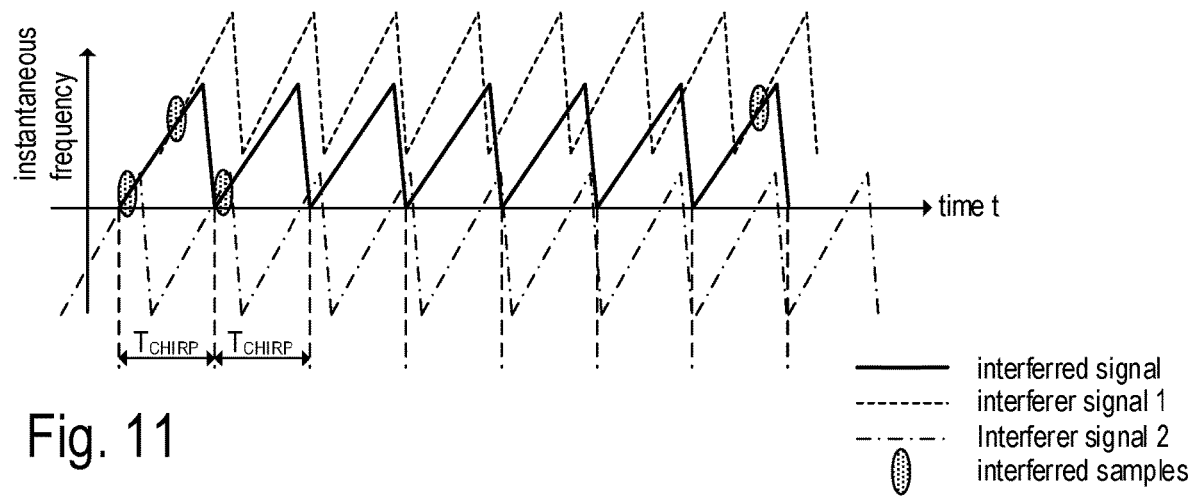
FIGS. 11 and 12 illustrate the detection of impaired samples within a chirp frame and the replacement of regular chirps by scanning chirps in a chirp frame.

According to some implementations described herein, the start frequency $f_{START}$ of a chirp (and thus the sub-band, in which the chirp is generated) can be changed within a chirp frame. For this purpose a regular chirp of a chirp frame is replaced by a scanning chirp. The replacement of regular chirps by a scanning chirp within a chirp frame can generally be at any position of a chirp within the chirp frame. For example, the $10^{th}$ regular chirp, the $86^{th}$ regular chirp or the $156^{th}$ regular chirp may be replaced. Furthermore, not only one regular chirp but more than one regular chirps within the chirp frame may be replaced. The decision, whether a regular chirp is replaced by a scanning chirp and which chirp is replaced, may depend on detected interference. FIG. 11 illustrates a situation, in which the operation of a radar sensor is disturbed by two interferers. The diagram of FIG. 11 illustrates a portion of a chirp frame radiated during a radar data acquisition. The solid line represents the frequency of the LO-Signal $s_{LO}(t)$ of the radar sensor. The dashed line and the dash-dotted line represent the frequencies of interfering signals interspersed into the reception channel of the radar sensor. The shaded areas mark the regions (e.g. the time intervals) in which the instantaneous frequencies of the interferers lie within a certain corridor around the frequency $f_{LO}$ of the LO signal $s_{LO}(t)$ of the radar sensor and thus interference can occur. The width of the mentioned corridor depends on the bandwidth $BW_{BB}$ of the base-band signal (see also FIG. 5 or 10).

Figure 12:
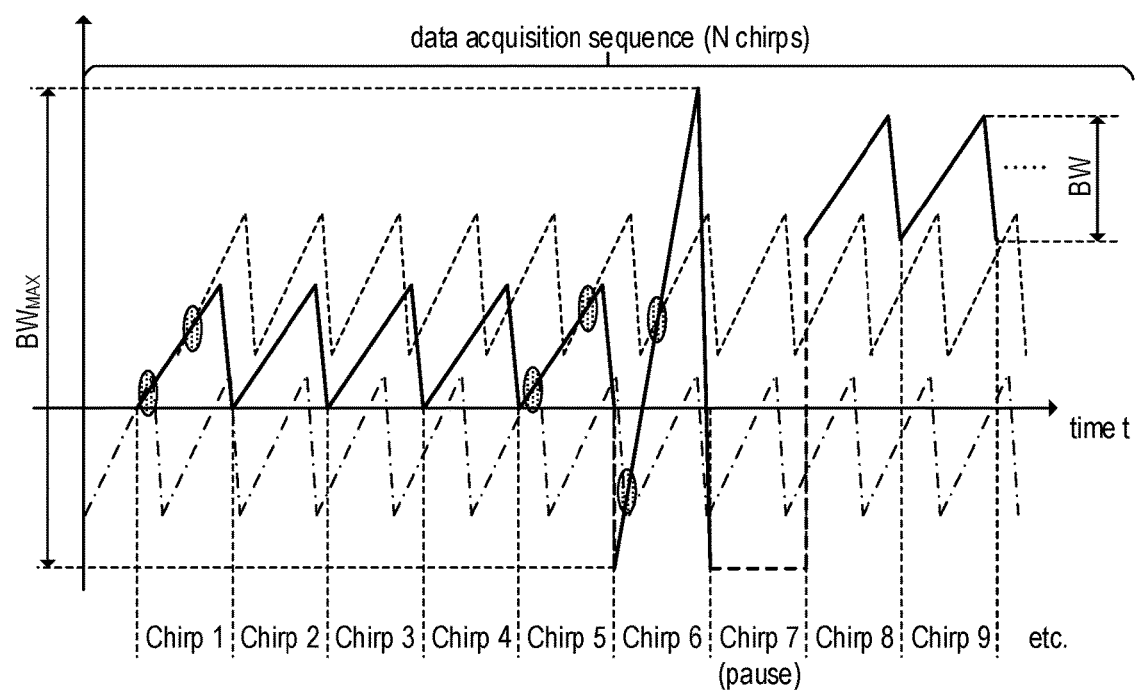

Within a chirp frame, which has N chirp positions (e.g. N time slots in which a chirp may be generated), impaired samples may be repeatedly detected (e.g. sample-by-sample), wherein each impaired sample can be mapped to a corresponding "blocked" frequency, while the remaining frequencies are considered to be "free" (devoid of interference). In FIG. 12, the mentioned chirp positions are labelled with "Chirp 1", "Chirp 2", "Chirp 3", etc. The chirp positions define the temporal positions (e.g. time slots) of the chirps of a chirp frame. The time slots of a frame have a defined length (chirp length $T_{CHIRP}$) and are equal throughout a chirp frame. Within a chirp frame, a controller (cf. FIG. 7) may decide, based on the samples detected as impaired, that a scanning chirp is to be inserted into the current chirp frame. Accordingly, a scanning chirp is generated at one or more chirp positions as shown in the example of FIG. 12. That is, the regular chirps scheduled for these chirp positions are replaced by the scanning chirp. As mentioned above, the transmitter power is reduced (as compared to the regular transmitter power) or zero while generating the scanning chirp. Furthermore, it is important to maintain the timing of the chirp positions/time slots. That is, at least one scanning chirp is emitted at one or more consecutive chirp positions, wherein a scanning chirp may include a modulation pause during which the LO signal is not modulated (see FIG. 12, pause at chirp position "Chirp 7"). The modulation pause may be used for the calculations and the signal processing used for determining a free sub-band.

Based on the samples (during the scanning chirp and during the preceding regular chirps) detected as impaired and the respective frequencies, a free sub-band (or a sub-band with only a few interferences) may be selected and the start frequency $f_{START}$ may be adjusted for the subsequent chirps of the chirp frame as illustrated in FIG. 12. The digital radar data (e.g. the samples of the digital radar signal) corresponding to the chirp positions "Chirp 6" and "Chirp 7", which are occupied by the scanning chirp, may be replaced by default values, e.g. by zero (zero padding). A zero-padding of those segments of a frame of the digital radar signal, which correspond to chirp positions occupied by the scanning chirp (and, as the case may be, the modulation pause), may slightly reduce the quality of target detection. However, the impact of the zero padding will be relatively small (or even negligible) when only one or a few regular chirps are replaced by scanning chirps in one frame, which usually includes a relatively high number (e.g. N=256 or N=512) of chirp positions. The resulting frame can still be processed using standard Range-Doppler signal processing Techniques for target detection.

Figure 13:
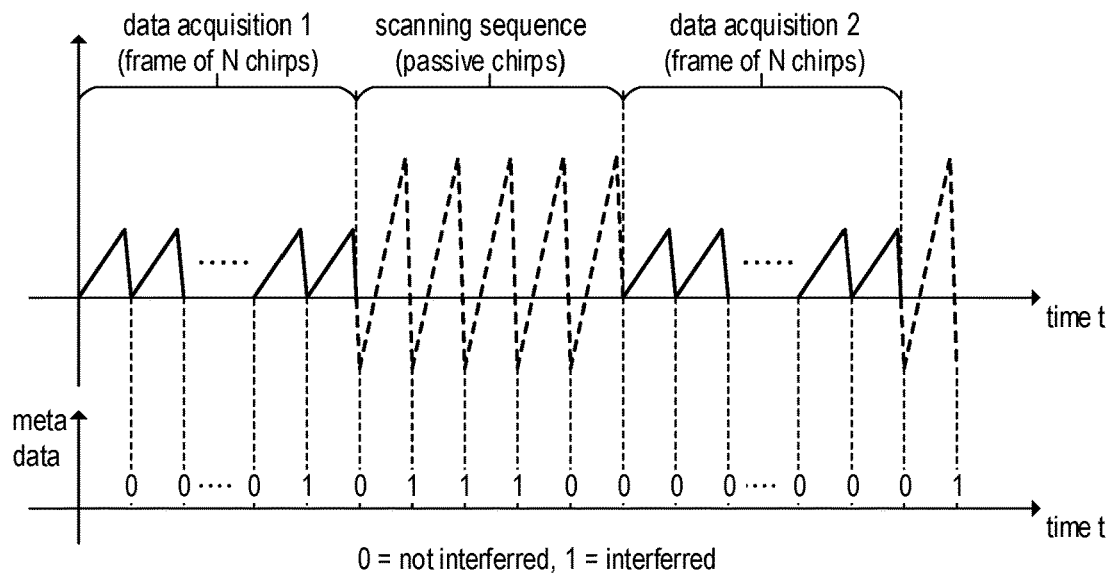
FIG. 13 illustrates the continuous generation of chirps by inserting a sequence of scanning chirps into the inter-frame space.

In the examples discussed so far only one chirp frame has been considered. It is, however, understood that, during normal operation, a radar sensor radiates a plurality of consecutive chirp frames via a plurality of transmit channels (in multi-channel systems). In the example of FIG. 13, an inter-frame space is used to generate passive scanning chirps in order to regularly and continuously monitor interferences and to use the information concerning interferences to regularly adjust the starting frequency $f_{START}$ of the (active) regular chirps. In the example of FIG. 13, the scanning chirps are passive chirps (transmitter power low or zero) but need not have a bandwidth higher than the regular chirp bandwidth BW. It, nevertheless, may be useful to generate broadband chirps as scanning chirps.

In some implementations, the inter-frame space may also be partitions into chirp positions/time-slots that have the same length $T_{CHIRP}$ as the chirp positions/time-slots of the chirp frames used for radar data acquisition (see FIG. 12).

The information as to which samples are detected as being impaired by interference is further referred to as metadata (because it represents data about the digital radar data). In one example, the metadata includes one bit (impaired/not impaired) per sample of the digital radar data provided by the ADC 30 (see FIG. 8). It is noted that in this case each bit of the metadata can be directly mapped to a discrete frequency as discussed with reference to FIG. 10. The metadata may be continuously (repeatedly for each chirp, each sample, or each group of samples) generated and analyzed. Based on the metadata, the start frequency $f_{START}$ of the regular chirps of the chirp frames may be updated. An update of the start frequency may be done before a new data acquisition starts and a new chirp frame begins or also within a chirp frame. It is understood that the implementations and concepts described herein may be combined with each other.

Figure 14:
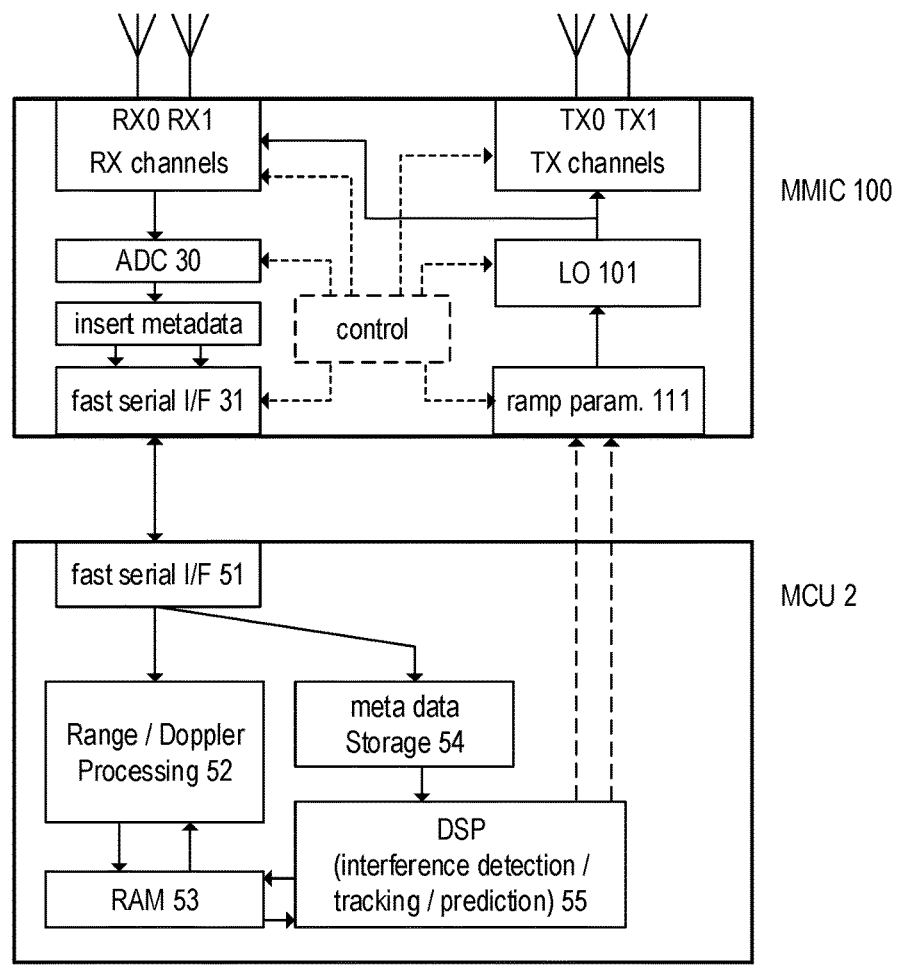
FIG. 14 illustrates a radar system including a MMIC and a separate controller chip in which radar data and metadata are processed independently.

FIG. 14 illustrates a block diagram of a radar system in which parts of the system controller 50 and the signal processor 40 (cf. FIG. 7) are integrated in a separate chip. As mentioned, the controller 50 and the digital signal processor 40 are regarded as functional units which may have several sub-units that may be distributed across two or more chips. The MMIC 100 includes one or more receive channels RX0, RX1, and one or more transmit channels TX0, TX1, which may be constructed similar to the example of FIG. 8. The local oscillator 101 generates the (frequency modulated) LO signal $s_{LO}(t)$ which may be amplified and radiated as RF radar signals via the transmit channels. Further, the LO signal $s_{LO}(t)$ is used to demodulate the received RF signals as discussed with reference to FIG. 8. The resulting base band signals are digitized using one or more analog-to-digital converters (see FIG. 14, ADC 30).

The frequency modulation provided by the local oscillator LO 101 is controlled by a ramp generator 111, which is basically a circuit that controls the chirp parameters such as start frequency $f_{START}$, stop frequency $f_{STOP}$, chirp duration $T_{CHIRP}$, modulation pause, etc. (see also FIG. 2). The functional block/processing unit/control circuitry labeled "insert metadata" is configured to generate the metadata that, as discussed above (e.g. using a threshold TH, cf. FIG. 10), indicates which of the individual samples of the digital radar signal are impaired by interference and to merge the metadata and the digital radar data to generate a data stream that is transferred to the controller chip 2 via a high-speed serial communication link (see FIG. 14, serial interfaces 31 and 51). It is noted that the control circuitry, which inserts the meta data into the radar data stream provided by the ADC 30, may be configured in a way that the data stream transmitted via the communication link includes only metadata in the time intervals between chirp frames (inter-fame space) when only (passive) scanning chirps are generated. This avoids overloading the memory (see FIG. 14, memory 53) of the MCU 2 shown in FIG. 14.

In the controller chip 2, the data stream received via the high-speed serial communication link is separated into the digital radar data and the metadata. The metadata may be buffered in a memory 54. The digital radar data may be processed in any known way (see FIG. 14, Range/Doppler processor 52 and memory 53) to detect radar targets, e.g. using Range-Doppler Processing, CFAR algorithms, etc. (CFAR=Constant False Alarm Rate). The metadata stored in memory 54 may be continuously processed (see FIG. 15, DSP 55) to determine a suitable free or optimum sub-band (defined, for example by a start frequency $f_{START}$ and chirp bandwidth BW) for the regular chirps radiated during the chirp frames. The system structure of FIG. 14 allows a processing of the metadata independently and concurrently with the Range/Doppler processing, and the processing of the metadata does not load the Range/Doppler processor (see FIG. 14, Range/Doppler processor 52). Because the metadata are separated from digital radar data (e.g. the digital radar signal y[n] provided by ADC 30) before being stored/buffered in memory 54, the behavior of the Range/Doppler processor 52 cannot be affected by the metadata generated during the time interval between the chirp frames (inter-frame space); such a concept allows to use a DSP 55 to analyze the metadata which can operate completely independent from the Range/Doppler processor 52.

The system structure shown in FIG. 14 allows for feedback from the DSP 55, which regularly determines an updated starting frequency $f_{START}$, to the ramp generator 111 in the MMIC 100. This feedback of the updated start frequency and, as the case may be, other ramp parameters, is indicated by the dashed lines in FIG. 14. This information may be exchanged via a dedicated communication channel such as, for example, a Serial Peripheral Interface (SPI), direct line connections connected to fast input/output pins, or a shared serial interface between MIMIC and MCU used for control, diagnostics and as well as updating the start frequency $f_{START}$ (and other chirp parameters) used by ramp generator 111.

The functional separation between the processing of the metadata (DSP 55) and the target detection (Range-Doppler processing 52) allows to implement the processing of the metadata using firmware that is programmed once into the controller chip 2 by the chip manufacturer and that cannot be changed by the customer, whereas the software implementing the target detection is, in many applications, under the control of the customer and thus can be changed by the customer. During operation of the radar system, the processing of metadata (DSP 55) and the target detection (Range-Doppler processing) operate concurrently and any change/update of the start frequency of the regular chirps of a chirp frame does not require any corresponding changes in the target detection.

Figure 15:
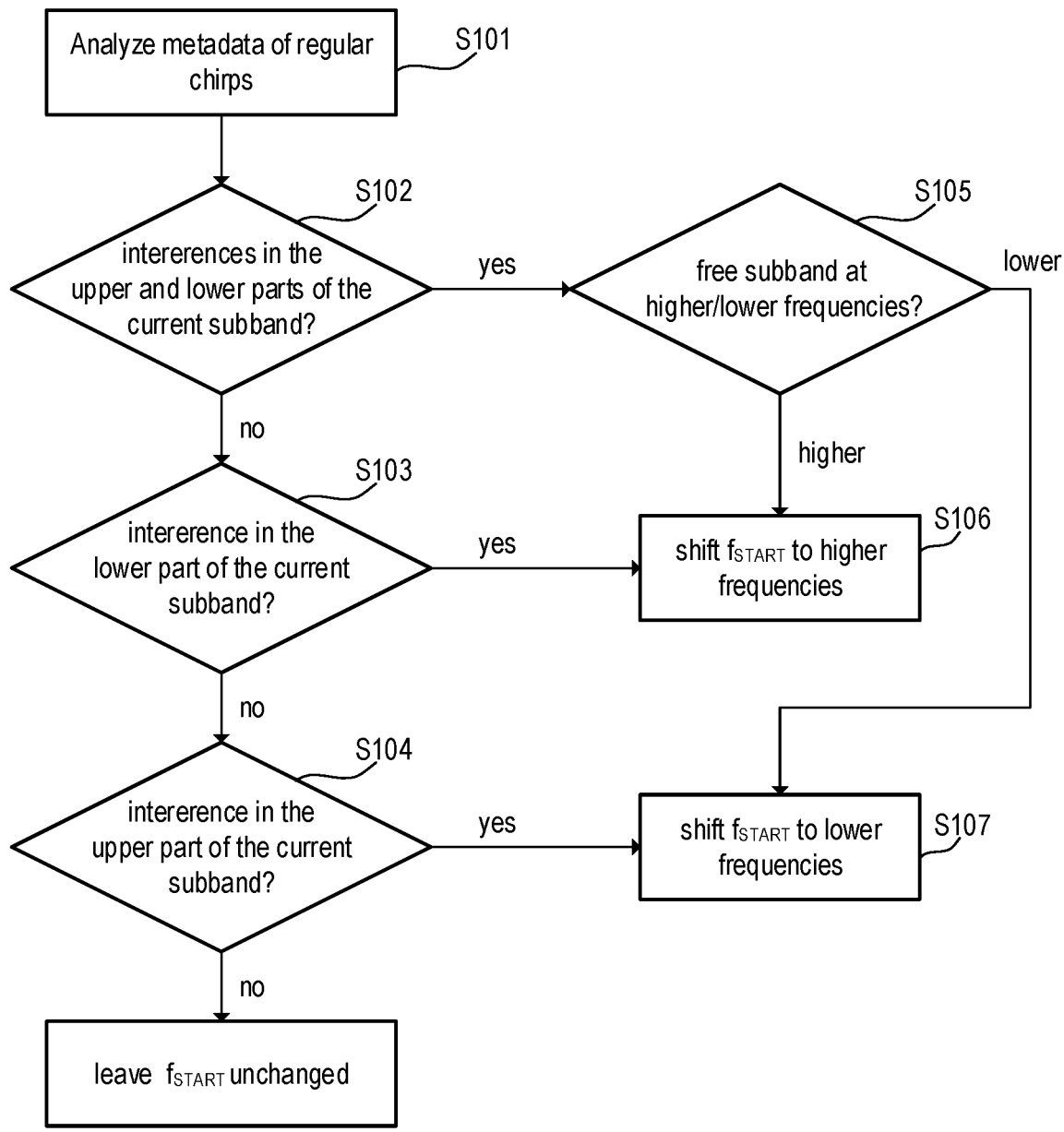
FIGS. 15 and 16 include flow charts illustrating examples of the processing of metadata.

FIG. 15 illustrates one example of the processing of metadata by the DSP 55 in the system of FIG. 14. Accordingly, the metadata, which may be received from the MMIC 100 via the fast serial communication link, is analyzed (see FIG. 15, step S101) in order to determine which frequencies of a specific regular chirp of a chirp frame are impaired by interference. As discussed above with reference to FIG. 10 each sample (sampled at a specific discrete time instant) can be directly mapped to a specific discrete frequency. Based on the analysis of the metadata the following situations may be distinguished. In the present example, the analysis of the metadata includes the subdivision of the current sub-band (frequency range from $f_{START}$ to $f_{STOP}$) of the regular chirps into an upper part and a lower part and to determine whether interferences occur in both, the upper and the lower part of the current sub-band (see FIG. 15, case differentiation S102), or in the lower part only (see FIG. 15, case differentiation S103) or in the upper part only (see FIG. 15, case differentiation S104). If both parts of the current sub-band include interferences, it may be checked whether a free sub-band exists at higher or lower frequencies (e.g. frequency ranges above or, respectively, below the current sub-band, see FIG. 15, case differentiation S105). This information may be available from a previous scan of the full band-width using scanning chirps as discussed above, e.g., with reference to FIG. 13. If a free sub-band has been found at higher frequencies (e.g. frequency range above the current sub-band), the start frequency $f_{START}$ (and thus the position of the current sub-band) is shifted to a higher frequency (see FIG. 15, step 106) so that a free (or less interfered) sub-band is used for the subsequent chirps. If a free sub-band has been found at lower frequencies (e.g. frequency range below the current sub-band), the start frequency $f_{START}$ is shifted to a lower frequency (see FIG. 15, step 107).

In a situation, in which the analysis of the metadata reveals that only the lower part of the current sub-band includes interfered frequencies, the start frequency $f_{START}$ for subsequent chirps of the current chirp frame may be shifted to higher frequencies (see FIG. 15, step S106). For example, the new/updated start frequency $f_{START}$ may be set directly above the highest frequency that has been identified as interfered. Alternatively, the new/updated start frequency $f_{START}$ may be set to a frequency in the upper part of the current sub-band. In a situation in which the analysis of the metadata reveals that only the upper part of the current sub-band includes interfered frequencies, the start frequency $f_{START}$ for subsequent chirps of the current chirp frame may be shifted towards lower frequencies (see FIG. 15, step S107). For example, the new/updated start frequency $f_{START}$ may be set such that the corresponding stop frequency $f_{STOP}=f_{START}+BW$ is directly below the lowest frequency that has been identified as interfered. Alternatively, the new/updated start frequency $f_{START}$ may be set such that the corresponding stop frequency $f_{STOP}$ is in the lower part of the current sub-band. It is understood that the decisions as to whether and how to shift the start frequency $f_{START}$ for subsequent chirps may be implemented in many different ways. Further, it is noted, that the purpose of FIG. 15 does not represent a complete algorithm for updating start-frequencies of regular chirps of a chirp frame based on a metadata analysis. FIG. 15 is rather understood as a guideline that enables a skilled person to implement different solutions for shifting the current sub-band of regular chirps. The method steps/activities shown in the flow chart of FIG. 15 may be implemented in various different ways that may depend on the actual application.

Figure 16:
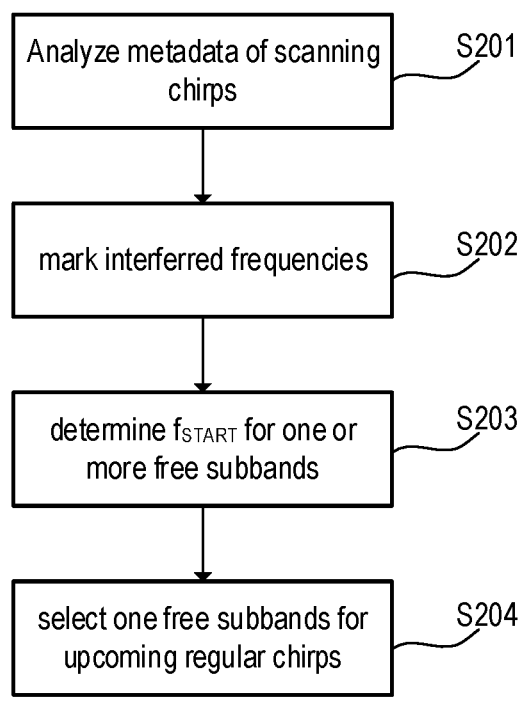

FIG. 16 illustrates, using a flow chart, another example of the processing of metadata by the DSP 55 in the system of FIG. 14. It is noted that the example of FIG. 16 is not an alternative to the previous example of FIG. 15, as both examples can be combined. FIG. 15 relates to the processing of metadata relating to regular chirps of a chirp frame, whereas FIG. 16 relates to the processing of metadata relating to scanning chirps generated in the inter-frame space (see FIG. 13) that may have a higher bandwidth than regular chirps of a chirp frame. According to FIG. 16, the metadata of the scanning chirps is analyzed (see FIG. 16, step S201). This analysis (see FIG. 16, step S201) may include checking which frequencies are interfered as discussed above with reference to FIG. 10. As explained above, each sample corresponds to a specific time instant and a respective discrete frequency. Accordingly, each interfered frequency may be marked (see FIG. 16, step S202) and any coherent group of frequencies that are not marked as interfered may be regarded as free sub-bands (FIG. 16, step S203). This allows to select a suitable starting frequency $f_{START}$ within the free sub-bands for the upcoming regular chirps of the next chirp frame.

Below some example implementations described above are summarized. It is emphasized, however, that the following enumeration, which includes 20 items, is not an exhaustive but rather a summary of example implementation included in the above description.

Example 1: A method comprising: receiving an RF radar signal (cf. FIG. 8, signal $y_{RF}(t)$); down-converting the received RF radar signal into a base band using a frequency-modulated local oscillator signal (cf. FIG. 8, signal $s_{LO}(t)$) including a scanning chirp having a higher bandwidth (cf. FIG. 9, maximum bandwidth $BW_{MAX}$) than a regular chirp bandwidth (cf. FIG. 9, bandwidth BW); generating a digital base band signal (cf. FIG. 8, y[n]) based on the down-converted RF radar signal, the digital base band signal including a sequence of samples associated with the scanning chirp; identifying, in the sequence of samples, impaired samples, which are affected by interference (cf. FIG. 10); and selecting—based on the position of the impaired samples within the sequence of samples—a sub-band, which has the regular chirp bandwidth, for transmitting chirps of chirp frame used for measurement data acquisition (cf. FIGS. 9 and 12).

Example 2: The method of example 1, wherein identifying affected samples comprises: checking, sample by sample, the sequence of samples to identify the samples that represent an RF radar signal power above a threshold as impaired samples.

Example 3: The method of example 1 or 2, wherein the positions of the impaired samples correspond to frequency values within the radar bandwidth, and wherein the sub-band is selected such that it includes no or as few as possible frequency values corresponding to positions of impaired samples.

Example 4: The method of any of examples 1 to 3, wherein no or only a negligibly small RF power is transmitted while down-converting the received RF radar signal into a base band using the frequency-modulated local oscillator signal including the scanning chirp.

Example 5: The method of any of examples 1 to 4 further comprising: frequency-modulating the local oscillator signal such that it includes a sequence of chirps in the selected sub-band; transmit an RF signal that is generated based on the local oscillator signal and includes the sequence of chirps in the selected sub-band; down-converting the received RF radar signal into the base band using the frequency-modulated local oscillator signal that includes the sequence of chirps in the selected sub-band and generating the digital base band signal; detecting one or more radar targets based on the resulting digital base band signal.

Example 6: A method comprising: generating a frequency-modulated local oscillator signal (cf. FIG. 8, signal $s_{LO}(t)$) including a frame partitioned into N chirp positions, N being a predefined integer number; wherein the frame includes at least one scanning chirp at one or more chirp positions and regular chirps at the remaining chirp positions, the regular chirps having a chirp bandwidth and a start frequency and the at least one scanning chirp having a scanning bandwidth higher than the chirp bandwidth (cf. FIG. 12); transmitting an RF signal representing the frame, wherein the transmitter power is zero or reduced below a regular chirp power while transmitting the at least one scanning chirp; receiving an RF radar signal (see FIG. 8, signal $y_{RF}(t)$) corresponding to the frame, down-converting the received RF radar signal into a base band using the local oscillator signal, and generating a digital signal (see FIG. 8, signal y[n]) based on the down-converted signal; detecting impaired samples, which are affected by interference, in a portion of the digital signal that corresponds to the scanning chirp, and updating the start frequency for the regular chirps following the scanning chirp based on the detected impaired samples; and detecting one or more radar targets based on the digital signal, wherein the portion of the digital signal not corresponding to the regular chirps is replaced by default samples.

Example 7: The method of example 6, wherein the frame includes a regular chirp at the first chirp position.

Example 8: The method of example 6 or 7, wherein a scanning chirp includes a frequency ramp extending over two or more chirp positions.

Example 9: The method of any of examples 6 to 8, wherein a scanning chirp includes a frequency ramp followed by a modulation pause.

Example 10: The method of any of examples 6 to 9, wherein the portion of the digital signal that does not correspond to the regular chirps is replaced by zero padding.

Example 11: The method of any of claims 6 to 9, wherein the digital signal includes N subsequences corresponding to the N chirp positions of the frame, each subsequence including M samples; and wherein detecting the one or more radar targets includes: calculating an N×M Range-Doppler-Map including M Range Fourier Trans-forms and N Doppler Fourier Transforms; detecting the one or more radar targets includes based on the N×M Range-Doppler-Map.

Example 12: A method comprising: generating a frequency-modulated local oscillator signal (cf. FIG. 9, signal $s_{LO}(t)$) including a plurality of frames of chirps and one or more scanning chirps between the frames; generating an RF signal, wherein a transmitter power of the RF signal is reduced or zero while generating the at least one scanning chirp; receiving an RF radar signal (cf. FIG. 8, signal $y_{RF}(t)$), down-converting the received RF radar signal into a base band using the local oscillator signal, and generating a digital signal based on the down-converted signal (cf. FIG. 8, signal y[n]), the digital signal being composed of a plurality of sequences, wherein each sequence corresponds either to a chirp of a specific frame or to a scanning chirp; repeatedly generating, for each sequence, metadata indicating whether the respective sequence is impaired by interference; and repeatedly determining a starting frequency for the chirps of the frames based on the metadata (cf. FIGS. 13 and 14).

Example 13: The method of example 12, wherein the metadata indicates, for each chirp, which portion(s) of a frequency band of the respective chirp is (are) impaired by interference.

Example 14: The method of example 12 or 13, wherein the metadata is indicative of sample positions, within each sequence, of samples impaired by interference.

Example 15: A radar system comprising: a local oscillator configured to generate a frequency-modulated local oscillator signal (cf. FIG. 14, LO 101, and FIG. 8, signal $s_{LO}(t)$) including a plurality of frames of chirps and one or more scanning chirps; at least one transmission channel (cf. FIG. 14, channels TX01, TX02), configured to generate an RF signal (cf. FIG. 8, signal $s_{RF}(t)$) based on the local oscillator signal, wherein a transmitter power of the RF signal is zero or reduced below a normal chirp power while generating the at least one scanning chirp; at least one reception channel (cf. FIG. 14, channels RX01, RX02) configured to receive an RF radar signal, down-convert the received RF radar signal into a base band using the local oscillator signal, and generate a digital signal based on the down-converted signal the digital signal being composed of a plurality of sequences, wherein each sequence corresponds either to a chirp of a specific frame or to a scanning chirp; a first processing unit (cf. FIG. 14, functional block "insert metadata") configured to repeatedly generate, for each sequence, metadata indicating whether the respective sequence is impaired by interference; and a second processing unit (cf. FIG. 14, DSP 55) configured to repeatedly determine a starting frequency for the chirps of the frames based on the metadata.

Example 16: The radar system of example 15, further comprising: a ramp generator (cf. FIG. 14, ramp generator 111) coupled to the local oscillator and configured to control the local oscillator in accordance with one or more ramp parameters including the starting frequency to cause the local oscillator to generate the frequency-modulated local oscillator signal including the plurality of frames of chirps and the one or more scanning chirps.

Example 17: The radar system of example 16, wherein the second processing unit is coupled to the ramp generator (cf. FIG. 14, connection indicated by dashed line) and configured to update the starting frequency used by the ramp generator.

Example 18: The radar system of any of claims 15 to 17, wherein the local oscillator, the ramp generator, the at least one reception channel (RX01, RX02) and the first processing unit are integrated in a MMIC, wherein second processing unit is integrated in a further integrated circuit (cf. FIG. 14, MCU 2), and wherein the MIMIC and the further integrated circuit are connected by a communication link for transmitting the digital signal and the respective metadata from the MMIC to the further integrated circuit (cf. FIG. 14, fast serial interfaces 31 and 51).

Example 19: The radar system of example 18, further comprising: a further connection between the MMIC and the further integrated circuit (see FIG. 14, connection indicated by dashed line), wherein the second processing unit is configured to update the starting frequency used by the ramp generator via the further connection.

Example 20: The radar system of any of example 15 to 19, further comprising: a third processing unit (cf. FIG. 14, Range/Doppler Processing) configured to detect one or more radar targets based on the digital signal, the third processing unit is operating independently from the second processing unit.

Example 21: A radar system comprising a local oscillator configured to generate a frequency-modulated local oscillator signal including a scanning chirp having a higher bandwidth than a regular chirp bandwidth and further comprising at least one reception channel configured to receive an RF radar signal, to down-convert the received RF radar signal into a base band using the frequency-modulated local oscillator signal including the scanning chirp, and to generate a digital base band signal based on the down-converted RF radar signal, the digital base band signal including a sequence of samples associated with the scanning chirp. The radar system further comprises a processing unit configured to receive the sequence of samples associated with the scanning chirp and to identify, in the sequence of samples, impaired samples, which are affected by interference, and to select, based on the position of the impaired samples within the sequence of samples, a sub-band, which has the regular chirp bandwidth, for transmitting chirps of a chirp frame used for one measurement data acquisition.

Example 22: A radar system comprising a local oscillator configured to generate a frequency-modulated local oscillator signal including a frame partitioned into N chirp positions (N being a predefined integer number), wherein the frame includes at least one scanning chirp at one or more chirp positions and regular chirps at the remaining chirp positions, the regular chirps having a chirp bandwidth and a start frequency and the at least one scanning chirp having a scanning bandwidth higher than the chirp bandwidth. The radar system further comprises at least one transmission channel configured to transmit an RF signal representing the frame, wherein a transmitter power is zero or reduced below a regular chirp power while transmitting the at least one scanning chirp. Furthermore, the radar system comprises at least one reception channel configured to receive an RF radar signal corresponding to the frame, to down-convert the received RF radar signal into the base band using the local oscillator signal, and to generate a digital signal based on the down-converted signal. A processing unit is configured to detect impaired samples, which are affected by interference, in a portion of the digital signal that corresponds to the scanning chirp, and to update the start frequency for the regular chirps following the scanning chirp based on the detected impaired samples. The processing unit is further configured to detect one or more radar targets based on the digital signal, wherein the portion of the digital signal not corresponding to the regular chirps is replaced by default samples.

It is understood that a (signal) processing unit may be any entity (including hardware or software or a combination of hard- and software) capable and configured to perform the desired methods and functions described herein. In various implementations, a processing unit be implemented using electronic circuits configured to process digital and/or analog signals in order to provide the functions used to implement the methods described herein. The electronic circuits, may include for example digital processors and memory for storing software instructions that, when executed by the processor, cause the electronic circuit to perform the desired functions. The electronic circuits of a processing unit may further include peripheral circuits which enable to processor to communicate and interact with other circuits. Additionally or as an alternative to a processor executing software, the electronic circuits may include hard-wired logic circuits that do not depend on software. The term software also includes firmware, which is usually programmed once into an integrated circuit. Other types of software may be applications specific and modifiable by a user. Processing units are sometimes also referred to as controllers, controller circuits or controller units, or controllers, controller circuits or controller units may include one or more processing units.

Although various implementations have been illustrated and described with respect to one or more specific implementations, alterations and/or modifications may be made to the illustrated examples without departing from the spirit and scope of the appended claims. With particular regard to the various functions performed by the above described components or structures (units, assemblies, devices, circuits, systems, etc.), the terms (including a reference to a "means") used to describe such components are intended to correspond—unless otherwise indicated—to any component or structure that performs the specified function of the described component (e.g., that is functionally equivalent), even if it is not structurally equivalent to the disclosed structure that performs the function in the herein illustrated example implementations of the implementation.

The invention claimed is:

1. A method comprising:
    transmitting an RF signal representing a frame of a frequency-modulated local oscillator signal, wherein the frame includes a scanning chirp and a regular chirp, the scanning chirp having a higher bandwidth than a regular chirp bandwidth of the regular chirp, wherein a transmitter power is zero dB or reduced below a power associated with the regular chirp while transmitting the scanning chirp, and wherein the scanning chirp includes a frequency ramp followed by a modulation pause;

receiving an RF radar signal;

down-converting the received RF radar signal into a base band using the frequency-modulated local oscillator signal including the scanning chirp;

generating a digital base band signal based on the down-converted RF radar signal, the digital base band signal including a sequence of samples associated with the scanning chirp;

identifying, in the sequence of samples, impaired samples, which are affected by interference; and selecting, based on positions of the impaired samples within the sequence of samples, a sub-band, which has the regular chirp bandwidth, for transmitting chirps of a chirp frame used for one measurement data acquisition.

2. The method of claim 1, wherein identifying the impaired samples comprises:

checking, sample by sample, the sequence of samples to identify samples that represent an RF radar signal power above a threshold as the impaired samples.

3. The method of claim 1, wherein the positions of the impaired samples correspond to frequency values within a radar bandwidth, and wherein the sub-band is selected such that the sub-band includes no or as few as possible frequency values corresponding to positions of impaired samples.

4. The method of claim 1, wherein no or only a negligibly small RF power is transmitted while down-converting the received RF radar signal into a base band using the frequency-modulated local oscillator signal including the scanning chirp.

5. The method of claim 1, further comprising:

frequency-modulating a local oscillator signal such that the local oscillator signal includes a sequence of chirps in the selected sub-band;

transmit an RF signal that is generated based on the frequency-modulated local oscillator signal and includes the sequence of chirps in the selected sub-band;

down-converting the received RF radar signal into the base band using the frequency-modulated local oscillator signal that includes the sequence of chirps in the selected sub-band and generating the digital base band signal; and detecting one or more radar targets based on the digital base band signal.

6. A method comprising:

generating a frequency-modulated local oscillator signal including a frame partitioned into N chirp positions, N being a predefined integer number; wherein the frame includes at least one scanning chirp at one or more chirp positions and regular chirps at remaining chirp positions, the regular chirps having a chirp bandwidth and a start frequency and the at least one scanning chirp having a scanning bandwidth higher than the chirp bandwidth, wherein a scanning chirp, of the at least one scanning chirp, includes a frequency ramp followed by a modulation pause;

transmitting an RF signal representing the frame, wherein a transmitter power is reduced below a power associated with the regular chirps while transmitting the at least one scanning chirp;

receiving an RF radar signal corresponding to the frame;

down-converting the received RF radar signal into a base band using the frequency-modulated local oscillator signal;

generating a digital signal based on the down-converted signal;

detecting first samples, which are affected by interference, in a portion of the digital signal that corresponds to the at least one scanning chirp;

updating the start frequency for the regular chirps following the at least one scanning chirp based on the detected first samples; and detecting one or more radar targets based on the digital signal, wherein the portion of the digital signal not corresponding to the regular chirps is replaced by default samples.

7. The method of claim 6, wherein the frame includes a regular chirp at a first chirp position.

8. The method of claim 6, wherein the frequency ramp extends over two or more chirp positions.

9. The method of claim 6, wherein the portion of the digital signal that does not correspond to the regular chirps is replaced by zero padding.

10. The method of claim 6, wherein the digital signal includes N subsequences corresponding to the N chirp positions of the frame, each subsequence including M samples; and wherein detecting the one or more radar targets includes:

calculating an N×M Range-Doppler-Map including M Range Fourier Transforms and N Doppler Fourier Transforms; and detecting the one or more radar targets includes based on the N×M Range-Doppler-Map.

11. A method comprising:

generating a frequency-modulated local oscillator signal including a plurality of frames of chirps and one or more scanning chirps between the frames used for measurement data acquisitions;

generating an RF signal representing a frame of the frequency-modulated local oscillator signal, wherein the frame includes a scanning chirp and a regular chirp, the scanning chirp having a higher bandwidth than a regular chirp bandwidth of the regular chip, wherein a transmitter power of the RF signal is reduced below a power associated with the regular chirp while generating the one or more scanning chirps, and wherein the scanning chirp includes a frequency ramp followed by a modulation pause;

receiving an RF radar signal;

down-converting the received RF radar signal into a base band using the frequency-modulated local oscillator signal;

generating a digital signal based on the down-converted signal, the digital signal being composed of a plurality of sequences, wherein each sequence, of the plurality of sequences, corresponds either to a chirp of a specific frame or to a scanning chirp;

repeatedly generating, for each sequence, metadata indicating whether a respective sequence is impaired by interference; and repeatedly determining a starting frequency for the plurality of frames of chirps based on the metadata.

12. The method of claim 11, wherein the metadata indicates, for each of the scanning chirp and the regular chirp, which at least one portion of a frequency band of a respective chirp is impaired by interference.

13. The method of claim 11, wherein the metadata is indicative of sample positions, within each sequence, of samples impaired by interference.

14. A radar system comprising:
- a local oscillator configured to generate a frequency-modulated local oscillator signal including a plurality of frames of chirps, each frame of chirps, of the plurality of frames of chirps, being partitioned into N chirp positions, N being a predefined integer number, wherein each frame of chirps includes one or more scanning chirps at one or more chirp positions and regular chirps at remaining chirp positions, wherein a scanning chirp, of the one or more scanning chirps, includes a frequency ramp followed by a modulation pause;
- at least one transmission channel, configured to generate an RF signal based on the frequency-modulated local oscillator signal, wherein a transmitter power of the RF signal is reduced below a power associated with the regular chirps while generating the one or more scanning chirps;
- at least one reception channel configured to:
  - receive an RF radar signal,
  - down-convert the received RF radar signal into a base band using the frequency-modulated local oscillator signal, and
  - generate a digital signal based on the down-converted signal, the digital signal being composed of a plurality of sequences, wherein each sequence, of the plurality of sequences, corresponds either to a chirp of a specific frame or to a scanning chirp;
- a first processing unit configured to repeatedly generate, for each sequence, metadata indicating whether the respective sequence is impaired by interference; and
- a second processing unit configured to repeatedly update a starting frequency for the regular chirps following the one or more scanning chirps of the frames based on the metadata.

15. The radar system of claim 14, further comprising:
- a ramp generator coupled to the local oscillator and configured to control the local oscillator in accordance with one or more ramp parameters including the starting frequency to cause the local oscillator to generate the frequency-modulated local oscillator signal including the plurality of frames of chirps and the one or more scanning chirps.

16. The radar system of claim 15, wherein the second processing unit is coupled to the ramp generator and configured to update the starting frequency used by the ramp generator.

17. The radar system of claim 15, wherein the local oscillator, the ramp generator, the at least one reception channel and the first processing unit are integrated in a monolithic microwave integrated circuit (MMIC),
- wherein second processing unit is integrated in a further integrated circuit, and
- wherein the MMIC and the further integrated circuit are connected by a communication link for transmitting the digital signal and respective metadata from the MMIC to the further integrated circuit.

18. The radar system of claim 17, further comprising:
- a further connection between the MMIC and the further integrated circuit,
  - wherein the second processing unit is configured to update the starting frequency used by the ramp generator via the further connection.

19. The radar system of claim 14, further comprising:
- a third processing unit configured to detect one or more radar targets based on the digital signal, the third processing unit is operating independently from the second processing unit, the second processing unit being configured to operate independently of and concurrently with the third processing unit.

20. The radar system of claim 14, wherein the metadata is indicative of sample positions, within each sequence, of samples impaired by interference.

* * * * *